United States Patent

Rochford et al.

Patent Number: 5,995,770
Date of Patent: Nov. 30, 1999

[54] SYSTEM AND METHOD OF DELIVERING A SCENT TO A PHOTOGRAPHIC PRINT

[75] Inventors: William T. Rochford, Rochester; Michael J. Ritz, Rochester, both of N.Y.

[73] Assignee: Eastman Kodak Company, Rochester, N.Y.

[21] Appl. No.: 09/046,446

[22] Filed: Mar. 24, 1998

[51] Int. Cl.[6] .................................................. G03B 17/24
[52] U.S. Cl. ............................................................. 396/311
[58] Field of Search ..................................... 396/310–321

[56] References Cited

U.S. PATENT DOCUMENTS

| | | |
|---|---|---|
| 3,578,482 | 5/1971 | Whitaker et al. . |
| 3,655,129 | 4/1972 | Seiner . |
| 4,254,179 | 3/1981 | Carson, III et al. . |
| 4,283,011 | 8/1981 | Spector . |
| 4,493,869 | 1/1985 | Sweeny et al. . |
| 4,528,226 | 7/1985 | Sweeny . |
| 5,130,745 | 7/1992 | Cloutier et al. . |
| 5,229,810 | 7/1993 | Cloutier et al. ........................... 396/311 |
| 5,318,327 | 6/1994 | Danewhvar . |
| 5,398,070 | 3/1995 | Lee ......................................... 348/553 |

FOREIGN PATENT DOCUMENTS

WO 93/08676  3/1993  WIPO .
WO 94/26375  11/1994  WIPO .

*Primary Examiner*—David M. Gray
*Attorney, Agent, or Firm*—David A. Novais; Frank Pincelli

[57] ABSTRACT

A method and system permits photographers and/or consumers to select from a menu an applicable scent which is to be applied to an image. The selection of the scent and associated image can be recorded and stored either on film or digitally. At a photofinishing site the scent information can be inputted to a device which then delivers the selected scent to a print, a set of prints or a package of prints. With the system and method of the present invention, a photographer and/or consumer can designate a digital image or a frame on a photosensitive film that is to be associated with a scent, and at a photofinishing site, the scent can be applied to the print of the image.

30 Claims, 6 Drawing Sheets

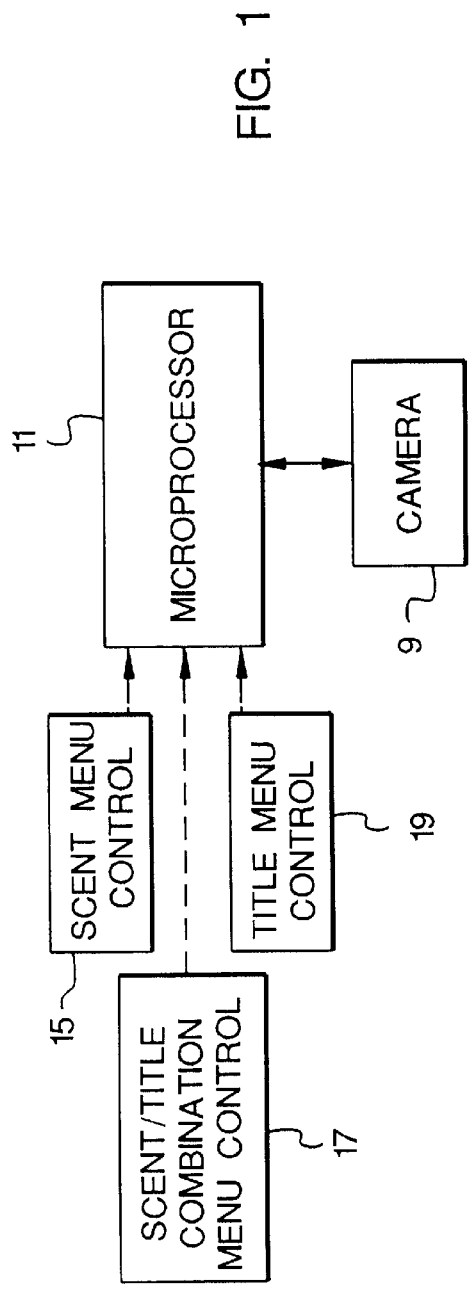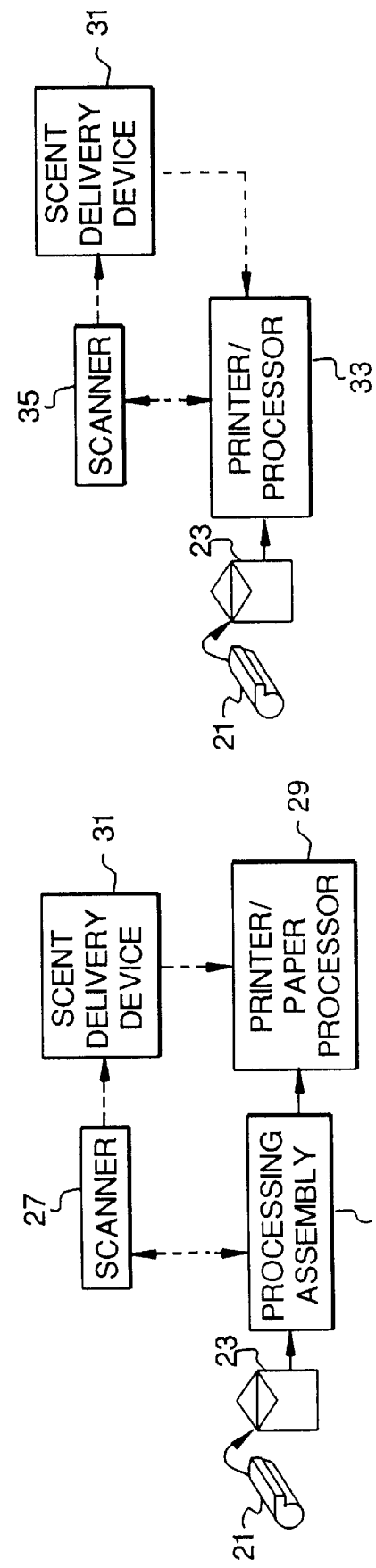

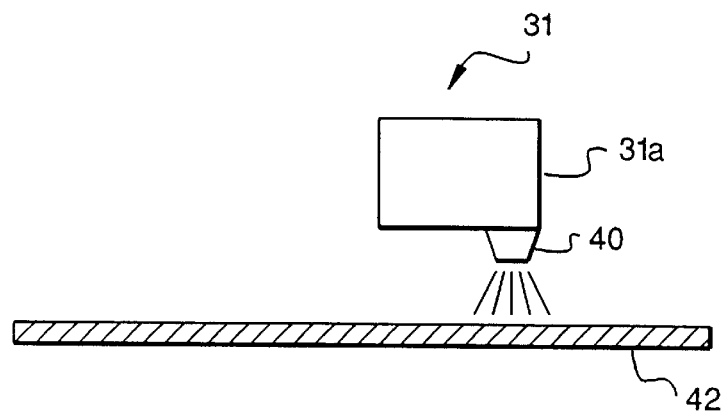
FIG. 4A
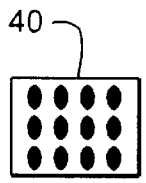
FIG. 4B
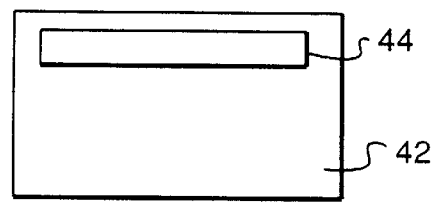
FIG. 4C
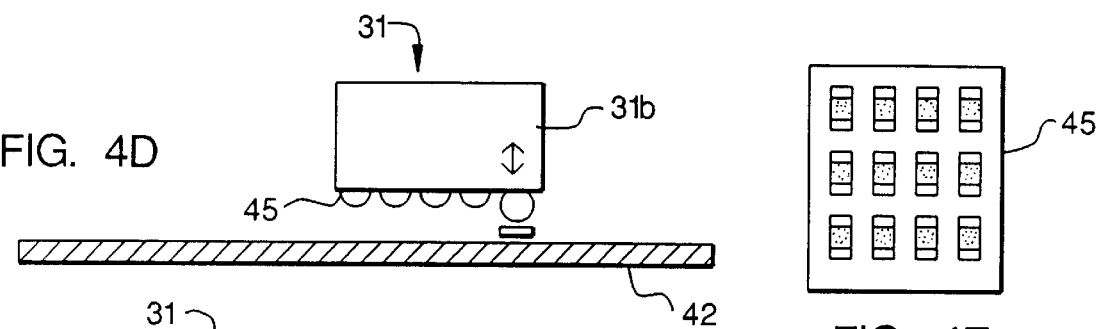
FIG. 4D
FIG. 4E
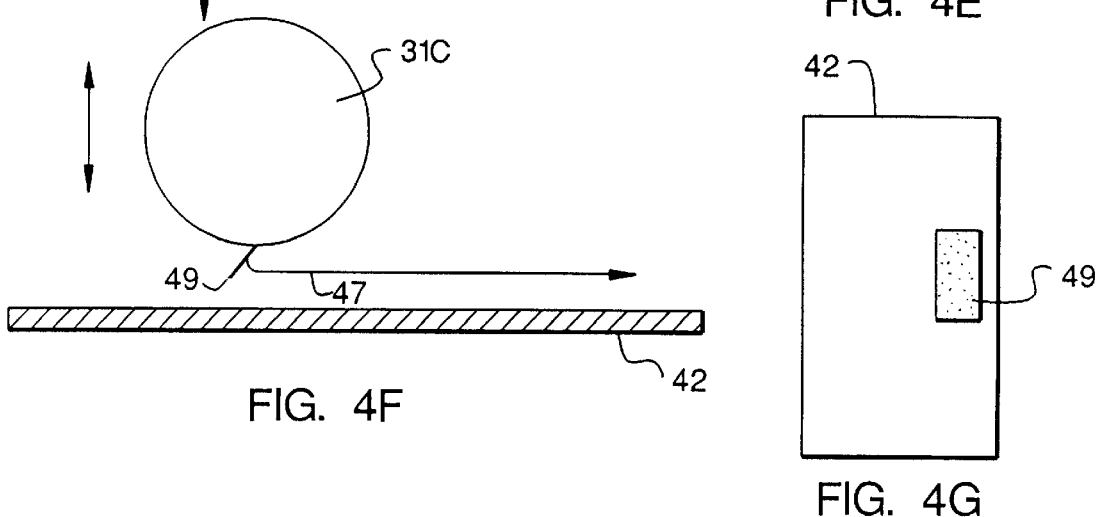
FIG. 4F
FIG. 4G

SYSTEM AND METHOD OF DELIVERING A SCENT TO A PHOTOGRAPHIC PRINT

CROSS REFERENCE TO RELATED APPLICATIONS

Reference is made to commonly assigned co-pending application U.S. Ser. No. 08/975,546 filed Nov. 20, 1997, entitled ELECTRONIC CAMERA WITH MICROFLUIDIC PRINTER THAT PRINTS SCENTED IMAGES of Dale F. McIntyre.

FIELD OF THE INVENTION

The present invention relates to the field of photoprocessing and more specifically, to a system and method of delivering a specific scent to a photographic print in response to a photographer's or consumer's instructions.

BACKGROUND OF THE INVENTION

Currently, Advanced Photo System arrangements provide the photographer with the capability of choosing a frame or roll title that will be magnetically encoded onto a film. During a printing operation, the information, such as a frame title of "Christmas" is printed on the back of the print. This provides the advantage of having a magnetically recorded description of the occasion on the print for future reference.

Conventional arrangements do not provide the consumer or photographer with the option of choosing from a plurality of scents, a specific scent that is to be associated with a particular image on a film, and subsequently delivered to a photographic print which includes the particular image. Additionally, conventional arrangements do not provide for the automatic association of a scent with a specific title. More specifically, conventional arrangements do not provide for the selective association of a scent to an image whether the image is an unexposed image on a photosensitive film, an exposed image on a photosensitive film, an image on a print or a digital image.

U.S. Pat. No. 5,318,327 provides for a card that has a scent-receiving zone and a greeting message receiving zone; however, this arrangement differs from the present invention in that it does not give the consumer or photographer the option of associating a specific scent to an image for subsequent delivery to a print, either during a picture-taking event or during photofinishing.

WO 93/08676 and WO 94/26375 each disclose a device for intensifying or increasing sensorial perception of visual and/or acoustic representations in, for example, theaters. In the devices disclosed by these two documents, scents which are associated with the specific visual and/or acoustic event are defused to viewers or listeners. However, these documents do not provide for the specific association of a scent with an image by a consumer or photographer, and the subsequent delivery of the scent to a print which includes the image during, for example, a photofinishing operation.

SUMMARY OF THE INVENTION

In a first feature of the system and method of the present invention, a photographer or consumer can select from a menu or submenu an applicable scent for a particular image. The selection of the scent can be recorded onto film such as Advanced Photo System film using a camera which can magnetically record information onto the film such as a Kodak ADVANTIX camera. At a photofinishing site, the film can be processed and scanned in order to read the magnetic information. The scent information is then supplied to a device or human which delivers the scent to the print, set of prints or package of prints. The scents can be delivered to the print via a number of known methods, and the scents can be active or passive.

In a further feature of the present invention, a consumer can insert an exposed roll of, for example, 35 mm film into a processing envelope, which includes an area for consumer information. In the area for consumer information of the processing envelope, the consumer can insert instructions as to a particular frame or image which is to be associated with a scent, and the particular scent which is to be applied to the frame. The 35 mm roll can then be processed in a wholesale lab or minilab, and the scent applied to the print based on the consumer's instructions. This would also be applicable to a processed 35 mm roll which the consumer inserts into an envelope and provides scent instructions.

In a further feature of the present invention, a digital image stored in a digital camera or computer, disk, etc., can be associated with a specific scent. That is, utilizing for example, a digital camera, the consumer can select a specific scent which is to be associated with the digital image. The scent and digital image information can then be sent to a photofinishing site where a hard copy format of the image is created. A scent delivery device can thereafter deliver the appropriate scent to the hard copy format of the image based on the scent information.

The present invention relates to a method of delivering a scent to a print during a photofinishing operation. The method comprises the steps of scanning a photosensitive film for information indicative of a frame of the photosensitive film that includes an image which is to be associated with a scent, and a specific scent which is to be delivered onto a print of the image which corresponds to the frame; and delivering the specific scent to the print based on the information.

The present invention also relates to a method of delivering a scent to a print which comprises the steps of reading information indicative of a frame on the photosensitive film that includes an image which is to be associated with a scent, and a specific scent which is to be delivered onto a print of the image which corresponds to the frame; inputting said information to a scent delivering device; and delivering the specific scent by way of the scent delivering device to the print based on said information.

The present invention also relates to a method of delivering a scent to a hard copy image format of an image which comprises the steps of selecting a scent which is to be associated with an image; storing the selected scent with the image; sending the stored selected scent and the image to a photofinishing station; creating a hard copy image format of the image; and delivering the selected scent to the hard copy image format of the image.

The present invention also relates to a processing system which comprises a processing station for processing a photosensitive film; a scanner which scans the photosensitive film for data indicative of information of a frame of the photosensitive film that includes an image which is to be associated with a scent, and a specific scent which is to be applied onto a print of the image which corresponds to the frame, and provides a signal indicative thereof; and a scent delivery device which stores a plurality of different scents, the scent delivery device receiving the signal from the scanner and applying the specific scent to the print.

The present invention also relates to a processing system which comprises a reading station for reading scent information indicative of a frame of a photosensitive film that includes an image which is to be associated with a scent, and a specific scent which is to be applied onto a print of the image which corresponds to the frame; and a work station including a scent delivering device which stores a plurality of different scents and delivers the specific scent to the print.

The present invention further relates to a processing system which comprises means for storing an image and a scent which is to be associated with the image, and providing a scent and associated image signal indicative thereof; a photofinishing station for creating a hard copy format of the image; and a scent delivering device which receives the scent and associated image signal and delivers the scent onto the hard copy format of the image.

The present invention further relates to a camera which comprises means for capturing an image of a subject; a selection control arrangement for selecting a scent from a plurality of scents which is to be associated with the captured image; and means for storing information of the selected scent and the captured image.

BRIEF DESCRIPTION OF THE DRAWINGS

FIG. 1 schematically illustrates various systems within a photographic camera applicable to the present invention.

FIGS. 3A and 3B are schematic illustrations of processing systems in accordance with the present invention;

FIGS. 4A–4G illustrate examples of scent delivery systems of the resent invention;

DETAILED DESCRIPTION OF THE INVENTION

Figure 2:
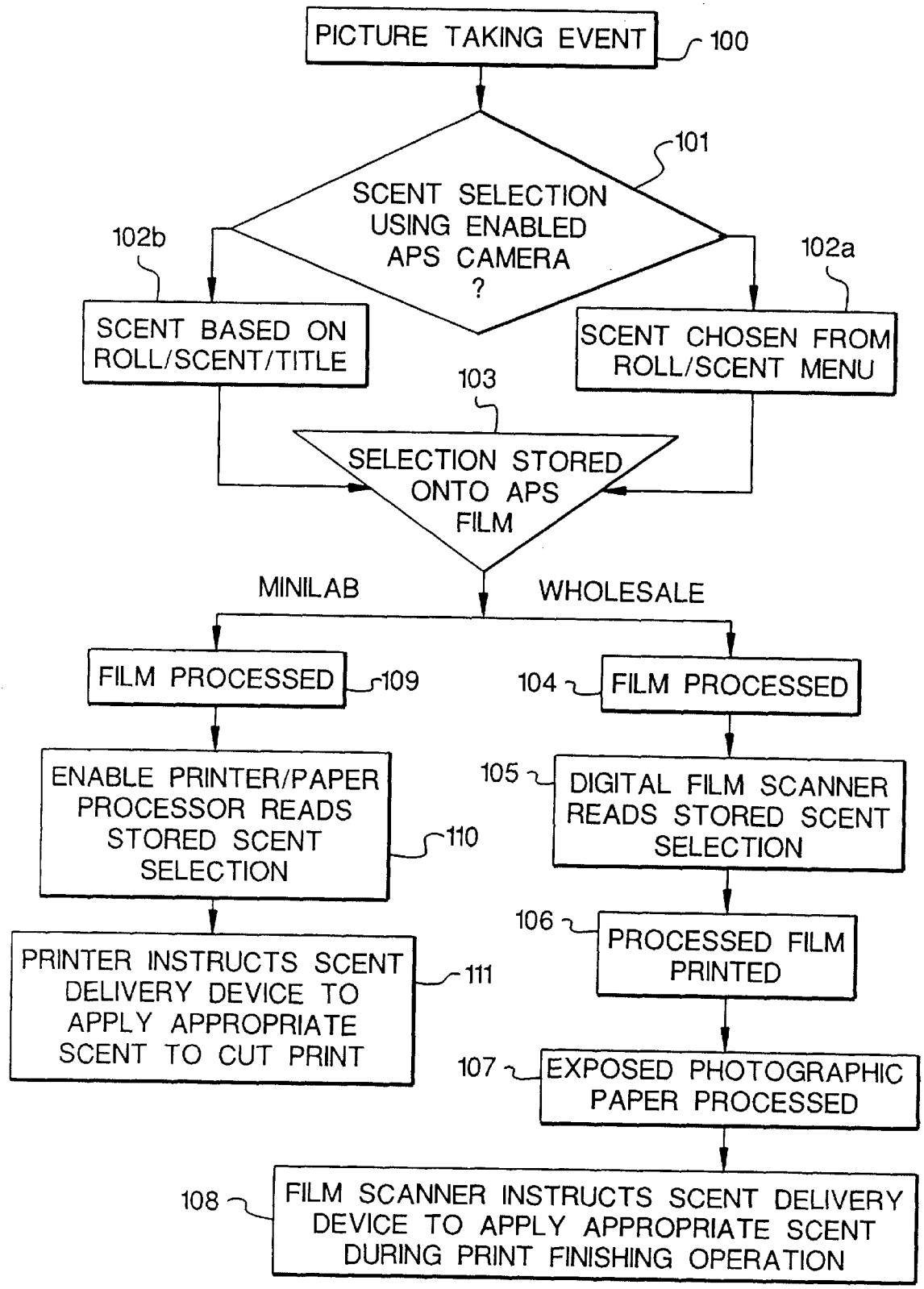
FIG. 2 illustrates a flow chart which shows a scent selection and delivery system in accordance with the present invention.

Referring now to the drawings, wherein like reference numerals designate identical or corresponding parts throughout the several views, FIG. 1 schematically illustrates an example of a photographic camera which can be utilized with the system and method of the present invention. The camera in FIG. 1 can be an Advanced Photo System camera such as a Kodak ADVANTIX camera. A known feature with such cameras is the inclusion of a title menu which enables a user to associate a title with a specific captured image by writing the title information on a frame of the photosensitive film which corresponds to the captured image. For example, in the case of Advanced Photo System film, the title information could be written on a magnetic layer of the film (see, for example, U.S. Pat. No. 5,130,745, the subject matter of which is herein incorporated by reference).

In a first feature of the present invention, a camera 9 as schematically shown in FIG. 1 includes a microprocessor 11 (see, for example, U.S. Pat. No. 5,130,745). Microprocessor 11 may accept order information to be magnetically recorded on the film in camera 9 from the photographer through camera controls. FIG. 1 only illustrates the camera controls which are applicable for the description of the present invention. It is recognized that the camera controls could input information such as the number of prints, the frame umber, names, addresses, etc., as shown in U.S. Pat. No. 5,130,745. The camera controls illustrated in FIG. 1 include a scent menu control 15 which enables the photographer to scroll through a plurality of scent information stored in microprocessor 11, and choose a specific scent which is to be associated with a particular frame and image. The scent information like the title information can be written on a magnetic layer of the photosensitive film. Camera 9 can also include a scent/title combination menu control 17. Control 17 enables the user to pick a frame and title and have scent information automatically associated with the title, with both title and scent information being stored in microprocessor 11. For example, if the individual picks the title "Christmas", a scent such as pine could be automatically associated with the title and, therefore, during a printing of the image, the title and scent could be applied to the print in a manner which will be described later. The system of the present invention also permits the photographer to choose a specific title that is desired to be applied to a particular frame on the film by using a title menu control 19, and selectively pick a scent which is also going to be applied to the particular frame using scent menu control 15.

FIG. 2 shows a flow chart indicative of a scent selection and delivery system of the present invention. As shown in FIG. 2, after a picture-taking event using a camera as illustrated in, for example, FIG. 1 (step 100), a scent selection as described above with reference to FIG. 1 is performed (step 101). As also described above, the scent can be chosen from a roll/scent menu which includes information on a plurality of scents (step 102a), or the scent can be based on a roll/scent/title (step 102b) which can automatically associate a scent with a selected title. At this point, a specific scent has been chosen which is to be associated with a specific captured image on a frame of the photosensitive film.

With respect to the choosing of a scent from a roll/scent menu (step 102a), each frame of a roll could have a different scent associated with it. For example, one frame could be titled by the photographer using the title menu control 19 on the camera as "Christmas", and then scent menu control 15 would allow the photographer to chose the scent from either, for example, pine, spices, cinnamon, pudding, etc. Another frame on the same roll could be designated to include the title "New Year", and then scent menu control 15 would allow the photographer to chose a scent from a list such as champagne, egg nog, etc. At the photofinishing site, the chosen scent is applied to the corresponding print as designated by the photographer.

With respect to the selection of a scent based on roll/scent/title (step 102b), in this feature, different scents can be associated with roll titles. For example, the roll title of "Christmas" selected on scent/title combination menu control 17 would have a predefined scent of pine or cinnamon, while the roll title of "Birthday" selected on scent/title combination menu control 17 could have a predefined scent of burning candles. However, scents do not necessarily need to be predefined for an event as described with reference to step 102b. A list of scents can be provided and a photographer can chose a specific scent from the list. For example, the photographer can chose a pine scent for a birthday party or burning candles for Christmas. This allows the photographer to customize his/her prints with scents. At a photofinishing station, the chosen scent would be applied to the corresponding set of prints or packaging as designated by the photographer.

The processing and photofinishing portion of the flow chart of FIG. 2 will now be explained. As noted in FIG. 2, after the selection is stored on the photosensitive film (step 103), the photographer or consumer can have the photosensitive film processed at either a wholesale lab or a minilab. With reference to the flow chart of FIG. 2, in a wholesale lab, the film is processed (step 104), and thereafter, a scanner such as a digital film scanner can read the scent selection which is stored on the photosensitive film. For example, the scanner can be a Kodak KDCFS scanner which is enabled to read magnetic information written on the magnetic layer of the photosensitive film (step 105). Thereafter, the processed film is printed (step 106) and exposed photographic paper based on the processed film is processed (step 107). At this point, the scanner instructs a scent delivery device to apply the selected scent to the print that includes the captured image during a print finishing operation (step 108).

In a minilab, the film is processed (step 109) and thereafter, an enabled printer/paper processor reads the stored scent selection (step 110). The printer will then instruct a scent delivery device to apply the selected scent to a cut print (step 111).

Examples of wholesale labs and minilabs which are applicable to the present invention will now be described with reference to FIGS. 3A and 3B. FIG. 3A schematically illustrates a wholesale lab. As shown in FIG. 3A, a cartridge 21 including photosensitive film with scent information written thereon can be inserted in a processing envelope and delivered to a processing assembly 25, or cartridge 21 can be directly delivered to processing assembly 25. Processing assembly 25 can be a known assembly that includes a series of tanks, for example, a developing tank, a bleaching tank, a fixing tank, etc. A photosensitive film is led through each of the tanks to perform developing, bleaching, fixing, washing, etc., with a different processing operation appropriate to that processing step being applied at the specific tank. During processing of the photosensitive film or immediately after processing, a scanner 27, such as a digital film scanner, scans the photosensitive film for information indicative of a frame of the photosensitive film that includes an image which is to be associated with a scent, and information on the particular scent which is to be delivered onto a print of the image which corresponds to the frame. After this information is received by scanner 27, the processed photosensitive film is processed and printed in a known manner by a printer/paper processor 29. As shown in FIG. 3A, printer/paper processor 29 is operationally associated with a scent delivery device 31. Scent delivery device 31 receives the frame and scent information from scanner 27 and applies the selected scent to the specific photographic print during a print finishing operation.

FIG. 3B schematically shows an example of the application of the system of the present invention in a minilab. As illustrated in FIG. 3B, cartridge 21 can be inserted into processing envelope 23 and delivered to a printer/processor 33 which processes the film and creates photographic prints. Printer/processor 33 is enabled to scan and/or read information stored on the photosensitive film. That is, printer/processor 33 can be operationally associated with a scanner 35, such as a digital scanner, which reads the scent and frame information from the photosensitive film and delivers the information to scent delivery device 31. Thereafter, scanner 35 instructs scent delivery device 31 to apply the selected scent to the cut photographic print.

The specifics of scent delivery device 31 will now be described with reference to FIGS. 4A–4G. Scent delivery device 31 can be based on scent delivery systems which are known in, for example, the fragrance and publishing industries. As shown in FIGS. 4A–4C, a first type of scene delivery device 31 could be a pump sprayer 31a, such as a piezoelectric pump sprayer, which includes an array of scent nozzles 40 attached to different containers operationally associated with pump sprayer 31a. It is noted that each container could contain a different scent. FIG. 4B is a bottom view showing how the nozzle array 40 with the different nozzles can be configured. Upon providing the instructions to scent delivery device 31 from scanner (27 or 35), pump sprayer 31a can select the appropriate scent container and apply the appropriate scent to the back of photographic print 42, opposite the image area, via the nozzle array 40 as illustrated in FIG. 4A. As an example, the scent can be sprayed to a specific area 44 on the back of photographic print 42 as illustrated in FIG. 4C.

FIG. 4D shows a scent delivery device 31 which is in the form of a member 31b having an array of sticker rolls 45 mounted thereon. FIG. 4E illustrates a bottom view showing the array of sticker rolls 45. Each of the sticker rolls 45 can include a different scent and based on the instructions from scanner (27 or 35), member 31b can be moveable, in the direction shown by the arrow in FIG. 4D, to apply the appropriate sticker onto the back of photographic print 42 opposite the image area.

As a further option as illustrated in FIG. 4F, scent delivery device 31 could be in a form of a sticker roll 31c which has an adhesive backing paper 47 which can be pulled by a take-up reel (not shown); and stickers 49 with scratch and sniff patches thereon. FIG. 4G is a view of a back of photographic print 42 having a scratch and sniff patch or sticker 49 applied thereon. Scratch and sniff patch or sticker 49 could be of a known type which has a permeated scent that is delivered upon the scratching of sticker or patch 49. Based on the instructions from scanner (27 or 35), sticker roll 31c can be moved in the direction of the up and down arrow shown in FIG. 4F to apply scented sticker or patch 49 to the back of the photographic print 42 opposite the image area as illustrated in FIG. 4G. It is noted that the movement of scent delivery device 31 as described above can be achieved by known moving mechanisms such as an electrical motor, a pneumatic motor, etc.

Of course, further examples of delivering scents to the back of prints are also possible. For example, one can use poly-traps or micro-sponges for applying scents to prints. Additionally, scent delivery device 31 can include a plurality of the above-described types of scent delivery systems 31a, 31b, 31c. Therefore, along with the scent and frame information, an individual can chose which type of scent delivery device, i.e., spray, sticker, scratch and sniff, etc., is to be applied. This information along with the scent and frame information can be magnetically encoded onto the photosensitive film.

Figure 5:
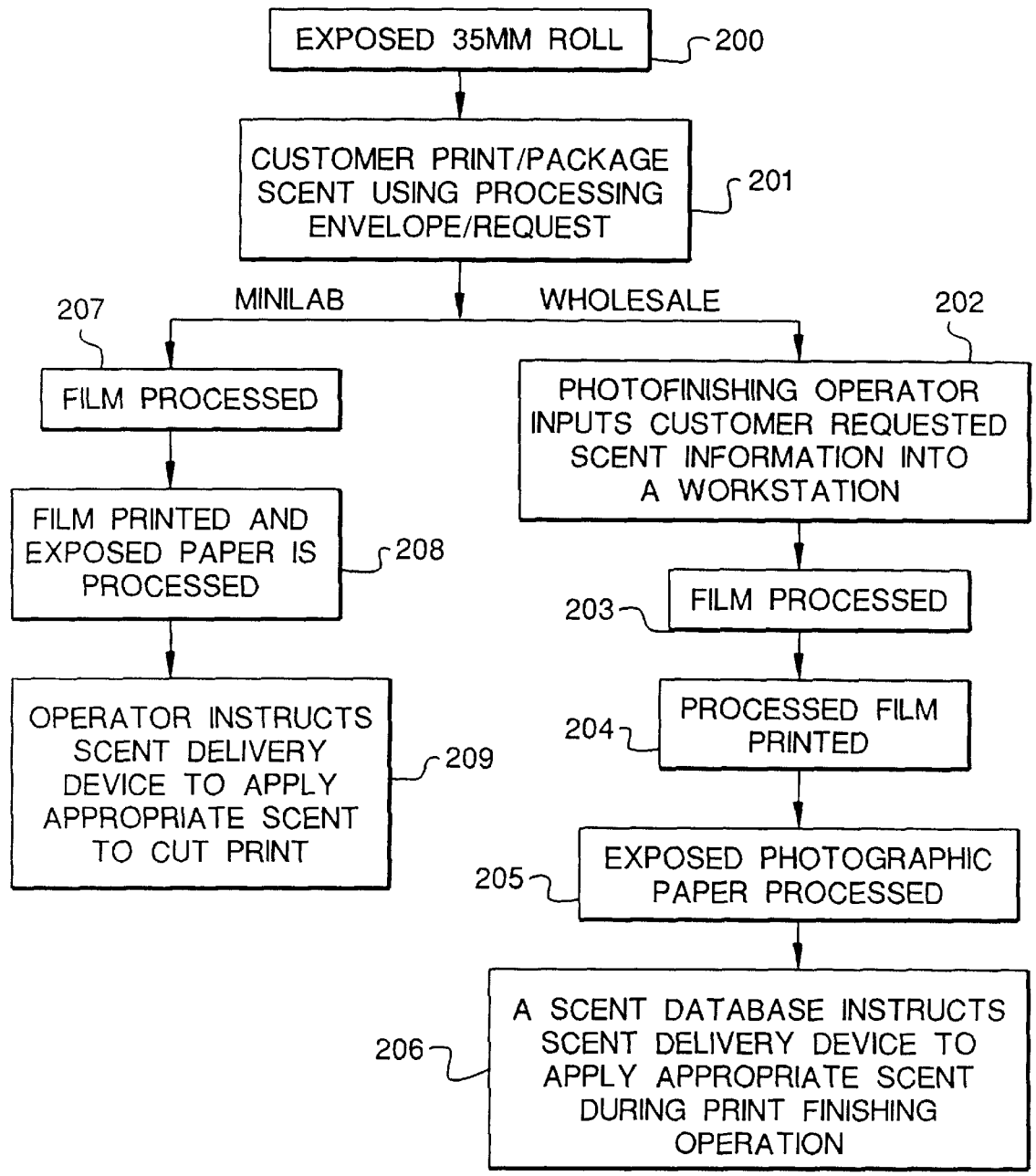
FIG. 5 is a flow chart which represents a further example of a scent selection and delivery system of the present invention.

It is noted that the present invention is not limited to the use of Advanced Photo System film, and as illustrated in FIG. 5, the system and method of the present invention can be realized using 35 mm film. As illustrated in FIG. 5, a customer can take an exposed roll of 35 mm film (step 200) and insert the exposed roll into a processing envelope. The processing envelope will include a customer input area where a customer can input scent information relating to the type of scent that the customer wants to apply to the print, as well as the specific frame of the photosensitive film in which the customer wants the scent to be applied (step 201).

At this point, the 35 mm roll can be processed either in a wholesale lab or a minilab. With respect to a wholesale lab, at a reading station of the lab, a photofinishing operator will input the customer requested scent information from the processing envelope into a workstation having a scent database by manually reading the information or scanning the information with a known scanner (step 202). The film is processed (step 203) utilizing a processor as illustrated in FIG. 3A. Exposed photographic paper based on the processed film is thereafter processed (step 205), and the scent database will instruct scent delivery device 31 to apply the appropriate scent during the print finishing operation (step 206).

With respect to a minilab (FIG. 3B), the film can be processed (step 207 of FIG. 5), and thereafter, the film printed and exposed paper processed (step 208). At a reading station an operator can read the scent information on the processing envelope and enter the information into scent delivery device 31, or the information can be scanned and automatically entered into scent delivery device 31. After receiving the scent information, scent delivery device 31 applies the selected scent to the appropriate cut print (step 209).

Figure 6:
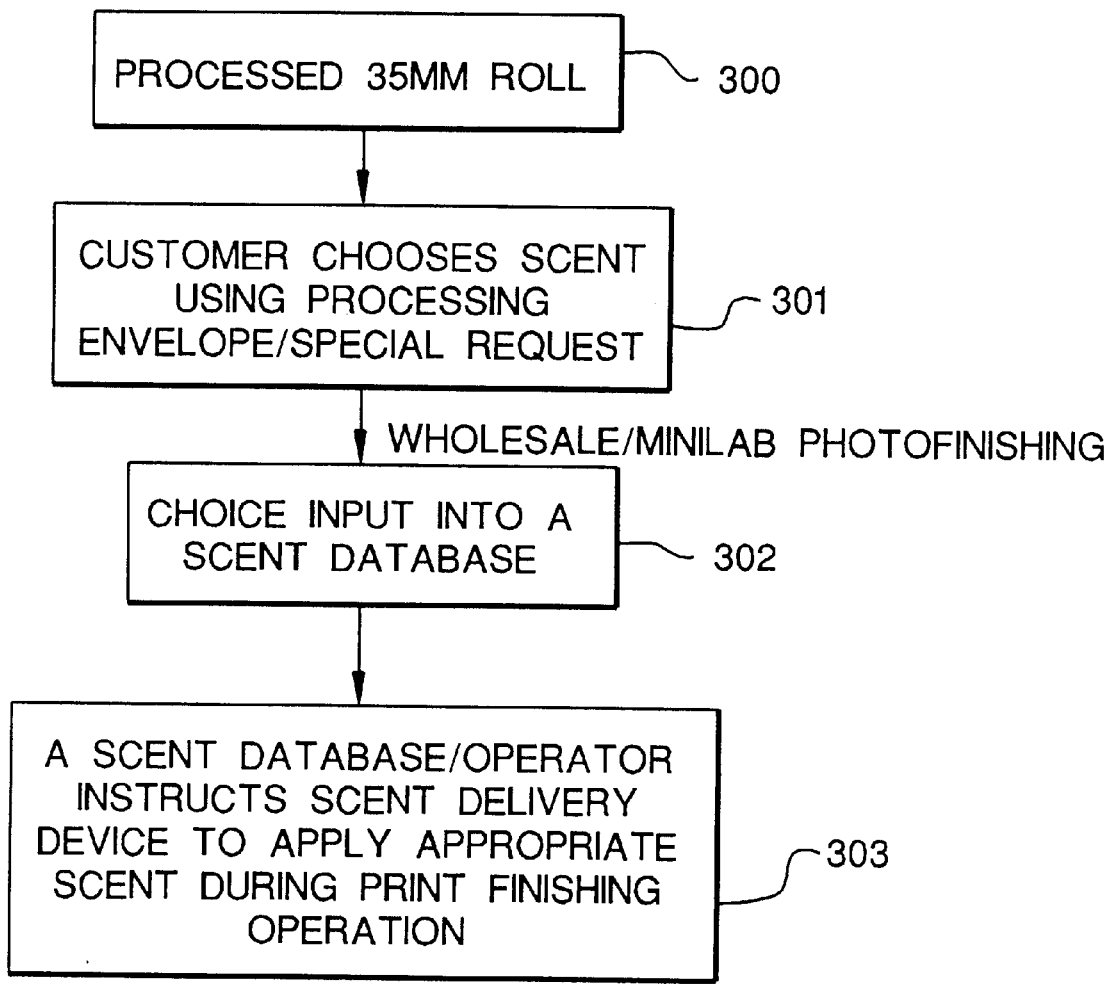
FIG. 6 is a further flow chart which illustrates an application of the scent selection and delivery system of the present invention.

As a further feature, the scent delivery system and method of the present invent is also applicable to reprints as illustrated in FIG. 6. As shown in the flow chart of FIG. 6, having a processed 35 mm roll (step 300), a consumer can choose a scent and write scent information concerning the scent and the frame on the film that the scent is to be applied, on a customer input area of the envelope (step 301). Thereafter, the processing envelope with the processed 35 mm roll therein can be delivered to a wholesale/minilab photofinishing site and the scent information from the processing envelope inputted into a scent database (step 302). Step 302 relates to a reading station where an operator can manually read the consumer information from the processing envelope and enter it into a scent database of scent delivery device 31, or the information from the processing envelope can be automatically scanned in. At this point, the scent database or the operator will instruct scent delivery device 31 to apply the appropriate scent during a print finishing operation as described above (step 303).

Figure 7:
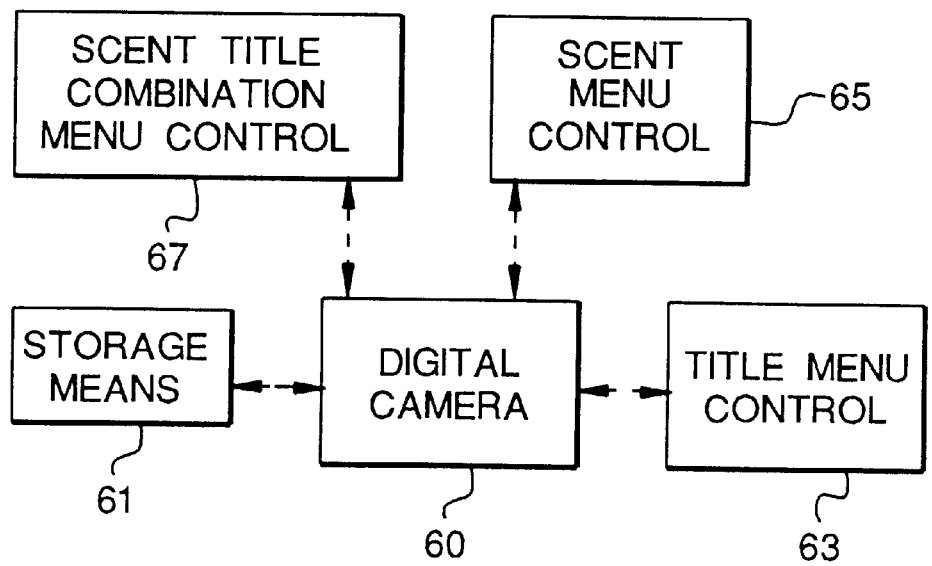
FIG. 7 schematically illustrates various systems within a digital camera applicable to a further feature of the present invention.

The system and apparatus of the present invention is also applicable to a digital photo system. For example, a digital camera could be utilized within the context of the present invention. FIG. 7 schematically illustrates a digital camera 60 such as a Kodak DC 20 camera. Digital Camera 60 includes an image capture and storage means 61 which digitally captures and stores an image by transforming reflected light information to an electronic signal. This electronic signal can be processed to a form that can be displayed on a monitor of camera 60 or remotely displayed on a computer, TV, etc. Camera 60 can further comprise a title menu control 63 and a selection control arrangement which can include a scent menu control 65 and a scent/title combination menu control 67, which each interact with camera 60 in response to the photographer's instructions. With use of camera 60 and with reference to the flow chart of FIG. 8, after the picture is taken and an image is captured and stored (step 400), a scent selection using one of controls 63, 65 or 67 is made (step 401).

That is, a photographer can choose a scent to be associated with the captured image by activating scent menu control 65 which enables the photographer to scroll through a plurality of scent information stored in the camera and choose the desired one which is to be associated with the captured image. The photographer can also activate title menu control 63 to designate a title for the captured image. As a further option, the photographer can activate scent/title combination menu control 67 which can provide the photographer with a menu of scent and title combinations from which the photographer can choose one to be associated with the captured image. As a still further option, camera 60 can include a control menu which enables the photographer to choose the type of scent delivery, i.e., spray, sticker, etc., as previously discussed.

Thereafter, the scent selection is stored with the digital image captured by the camera (step 402), which will automatically store images as well as scent information for those images which are to have a scent applied to a hard copy format of the image.

Figure 8:
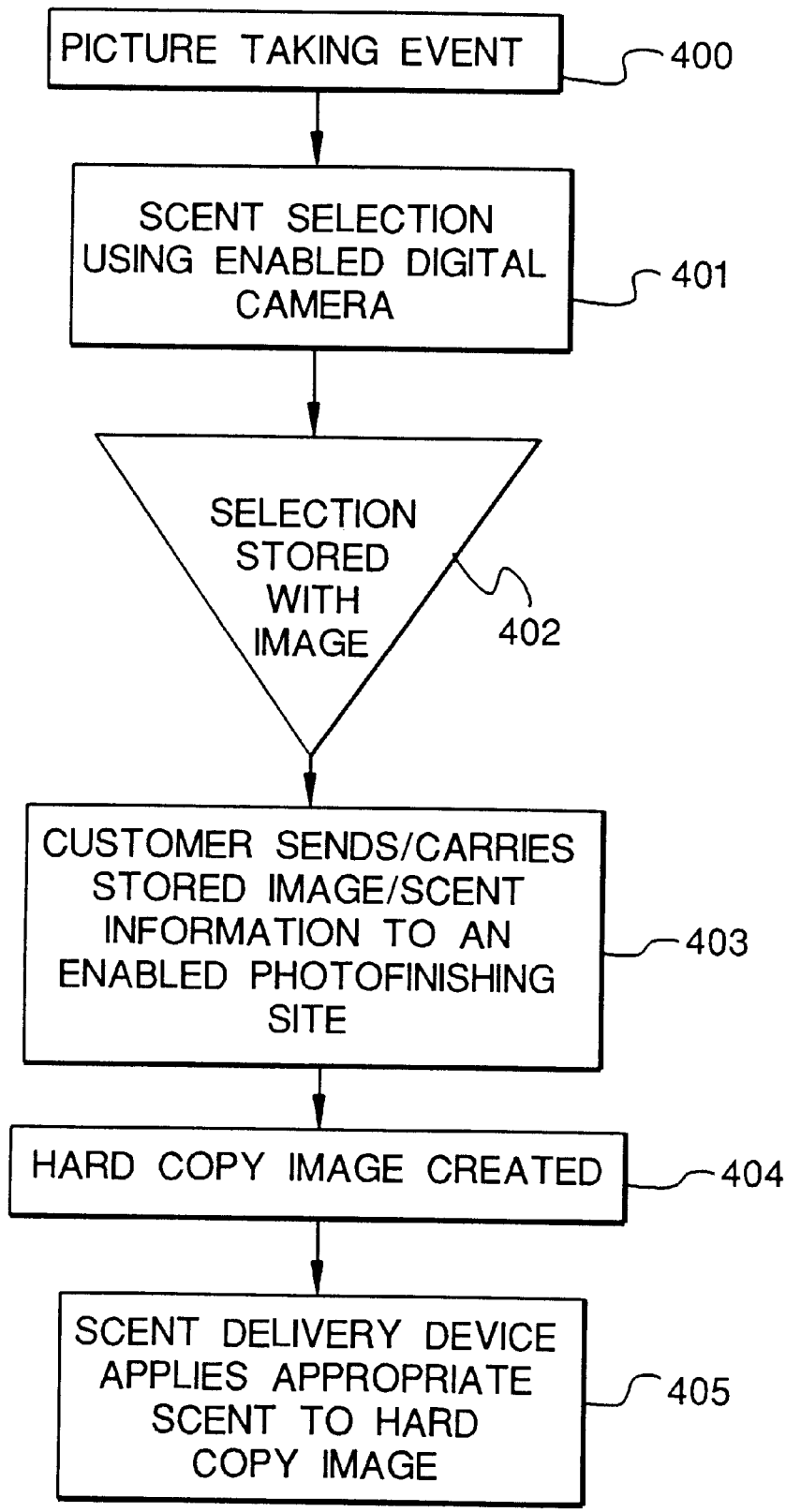
FIG. 8 is a further flow chart of an application of the scent selection and delivery system of the present invention.

As illustrated in FIG. 8, the photographer or consumer can send or carry the stored image/scent information to an enabled photofinishing site (step 403) and a hard copy format of the image can be created or printed (step 404). That is, the information with respect to the scent and the image can be inputted into an enabled printer which is operationally associated with a scent delivery device as illustrated in FIGS. 3A and 3B. Upon reading the specific scent which is to be applied to the image, the scent delivery device can apply the appropriate scent to a hard copy format of the image (step 405). As a further option with the use of a digital camera, the scent selection could be made at, for example, a computer. That is, the captured images could be transferred from the digital camera to a computer and stored therein. The consumer can then access the computer to view the images and select which image he wants associated with a scent and the type of scent he/she wants. The process can thereafter proceed as described above and explained with reference to steps 403–405 of FIG. 8.

The invention has been described in detail with particular reference to certain preferred embodiments thereof, but it will be understood that variations and modifications can be effected within the spirit and scope of the invention.

What is claimed is:

1. A method of delivering a scent to a print during a photofinishing operation, the method comprising the steps of:

scanning a photosensitive film for information indicative of a frame of said photosensitive film that includes an image which is to be associated with a scent, and a specific selected scent also to be associated with said image;

providing a print of said image; and delivering said specific scent to said print based on said information.

2. A method according to claim 1, wherein said information is on a magnetic layer of said photosensitive film.

3. A method according to claim 1, wherein said step of delivering said specific scent to said print comprises the step of delivering said specific scent to a back of said print.

4. A method according to claim 1, wherein said step of delivering said specific scent to said print comprises the step of spraying said specific scent to a back of said print.

5. A method according to claim 1, wherein said step of delivering said specific scent to said print comprises the step of applying a scented sticker which corresponds to said specific scent onto a back of said print.

6. A method of delivering a scent to a print, the method comprising the steps of:

reading information indicative of a frame on a photosensitive film that includes an image which is to be associated with a scent, and a specific selected scent which is to be delivered onto a print of said image which corresponds to said frame;

inputting said information to a scent delivering device;

providing a print of said image; and delivering said specific scent by way of said scent delivering device to said print based on said information.

7. A method according to claim 6, wherein said information is provided on a processing envelope having said photosensitive film inserted therein.

8. A method according to claim 6, wherein said step of delivering said specific scent comprises the step of delivering said specific scent to a back of said print.

9. A method according to claim 6, wherein said step of delivering said specific scent comprises spraying said specific scent to a back of said print.

10. A method according to claim 6, wherein said step of delivering said specific scent comprises applying a scented sticker which corresponds to said specific scent onto a back of said print.

11. A method according to claim 6, wherein said scent delivering device comprises at least one member with multiple scented patches which applies a scented patch from said multiple scented patches to a back of said print based on said instructions.

12. A method of delivering a scent to a hard copy image format of an image, the method comprising the steps of:

selecting a scent which is to be associated with an image;

storing said selected scent with said image;

sending said stored selected scent and said image to a photofinishing station;

creating a hard copy of said image; and delivering said selected scent to said hard copy image format of said image.

13. A method according to claim 12, wherein said image is a digital image.

14. A method according to claim 12, wherein said step of delivering said selected scent comprises delivering said selected scent to a back of said print.

15. A method according to claim 12, wherein said step of delivering said selected scent comprises spraying said selected scent to a back of said print.

16. A method according to claim 12, wherein said step of delivering said selected scent comprises applying a scented sticker which corresponds to said selected scent onto a back of said print.

17. A processing system comprising:

a processing station for processing a photosensitive film;

a scanner which scans said photosensitive film for data indicative of information of a frame of said photosensitive film that includes an image which is to be associated with a scent, and a specific selected scent which is to be applied onto a print of said image which corresponds to said frame, and provides a signal indicative thereof; and a scent delivering device which stores a plurality of different scents, said scent delivery device receiving said signal from said scanner and applying said specific selected scent to said print.

18. A system according to claim 17, wherein said scent delivering device comprises a sprayer which sprays said specific scent onto a back of said print.

19. A system according to claim 17, wherein said scent delivering device comprises a member which holds an array of scented stickers and applies a scented sticker which corresponds to said specific scent to a back of said print based on said signal from the scanner.

20. A processing system comprising:

a reading station for reading selected scent information on a photosensitive film indicative of a frame of said photosensitive film that includes an image which is to be associated with a scent, and a specific scent which is to be applied onto a print of said image which corresponds to said frame; and a work station including a scent delivering device which stores a plurality of different scents and delivers said specific scent to said print.

21. A processing system according to claim 20, wherein said photosensitive film is delivered to said reading station in a processing envelope having a customer input area for inputting said scent information, such that said scent information on said processing envelope is read at said reading station and inputted to said scent delivery device.

22. A system according to claim 20, wherein said work station comprises an input section where said scent information is inputted, said input section providing a signal to said scent delivering device for delivering said specific scent to said print.

23. A system according to claim 20, wherein said work station comprises a processing section for processing said photosensitive film and a printing section for printing said processed photosensitive film, said specific scent being delivered to said print during a finishing operation of said print.

24. A system according to claim 20, wherein said scent delivering device comprises a sprayer which sprays said specific scent onto a back of said print.

25. A system according to claim 20, wherein said scent delivering device comprises a member which holds an array of scented stickers and applies a scented sticker onto a back of said print which corresponds to said specific scent.

26. A processing system comprising:

means for storing an image and a selected scent which is to be associated with said image, and providing a scent and associated image signal indicative thereof, a photofinishing station for creating a hard copy format of said image; and a scent delivering device which receives said scent and associated image signal and delivers said scent onto said hard copy format of said image.

27. A camera comprising:

means for capturing an image of a subject;

a selection control arrangement for selecting a scent from a plurality of scents which is to be associated with said captured image; and means for storing information of said selected scent and said captured image.

28. A camera according to claim 27, wherein said image is captured on a frame of a photosensitive film.

29. A camera according to claim 28, wherein said photosensitive film includes a magnetic layer and said information is stored on said magnetic layer.

30. A camera according to claim 27, wherein said captured image is a digital image and said selected scent is digitally stored with said image.

* * * * *